United States Patent
Chiang et al.

(10) Patent No.: US 6,725,420 B1
(45) Date of Patent: Apr. 20, 2004

(54) PATTERN DETECTION FOR COMPUTER SEGMENTS

(75) Inventors: Kevin Chiang, Fremont, CA (US); Shengquan Wu, Sunnyvale, CA (US)

(73) Assignee: Oak Technology, Inc., Sunnyvale, CA (US)

( * ) Notice: Subject to any disclaimer, the term of this patent is extended or adjusted under 35 U.S.C. 154(b) by 385 days.

(21) Appl. No.: 09/953,459

(22) Filed: Sep. 14, 2001

(51) Int. Cl.[7] ............................................. G06F 11/00
(52) U.S. Cl. ........................ 714/811; 714/799; 714/746
(58) Field of Search ............................... 714/1, 47, 700, 714/704, 746, 774, 779, 799, 809, 811

(56) References Cited

U.S. PATENT DOCUMENTS 5,047,919 A * 9/1991 Sterling et al. ............... 714/47

* cited by examiner

*Primary Examiner*—Phung M. Chung
(74) *Attorney, Agent, or Firm*—Parsons Hsue & de Runtz LLP

(57) ABSTRACT

Method and system for compensating for a segment length of one or more of three consecutive mark and space segments utilized in a computer system. The three segments are received at a first pre-processor, the first segment is separated and issued separately from the remaining two segments, and the first segment length is compared with a permitted range of lengths. If the first segment length is not within the permitted range, a first error signal is issued, preferably indicating the non-complying first length. This process is repeated at second and third pre-processors. A segment processor receives the three individual segments and the error signals and non-complying lengths, if any, and compensates or corrects for any non-complying segment lengths before further processing occurs.

10 Claims, 3 Drawing Sheets

PATTERN DETECTION FOR COMPUTER SEGMENTS

FIELD OF THE INVENTION

This invention relates to pattern detection in a sequence of computer marks and spaces.

BACKGROUND OF THE INVENTION

At present, a FIFO or similar device is used to store information about mark and space lengths. An error that occurs in such information will propagate and affect other device information downstream of the location where the error occurs.

What is needed is an approach that provides mark and space information but does not permit an error in such information to propagate much beyond the location where the error is first observed.

SUMMARY OF THE INVENTION

These needs are met by the invention, which provides a system that compares mark and space information immediately before a segment is received by a segment processor. Three consecutive segments, MK, PS and PM, are received by segment pre-processors, and the segment lengths, L(MK), L(PS) and L(PM), are determined. If one or another of these lengths is non-complying, the corresponding pre-processor optionally issues an error signal that is received by the processor before, or at the time that, the processor receives at least one of these three segments. The processor then compensates for, or corrects, a segment with a non-complying length.

DESCRIPTION OF BEST MODES OF THE INVENTION

Figure 1:
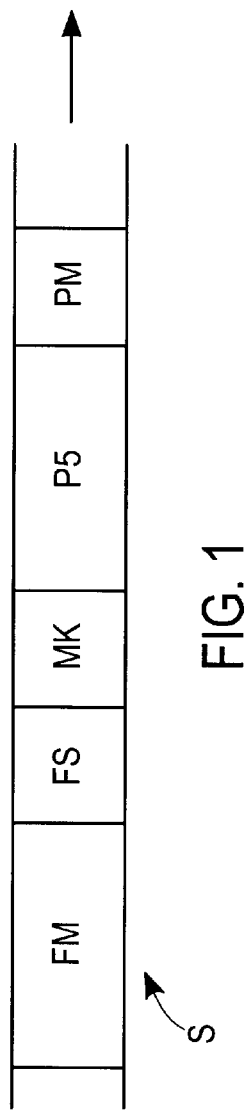
FIG. 1 schematically illustrates processing of a stream of consecutive marks and spaces.

FIG. 1 schematically illustrates a stream S of mark segments and space segments, with five consecutive segments being denoted PM (pre-mark), PS (pre-space), MK (mark of current interest), FS (following space) and FM (following mark), in order of receipt by a segment processor. Ideally, each mark and each space has a temporal length between 3T and 11T, where T is a selected temporal length (e.g., T=5 nsec). If a mark length or a space length lies outside this range, the system must be made aware, before this segment is processed, that an error is present and must take appropriate steps to compensate for or correct the error.

Figure 2:
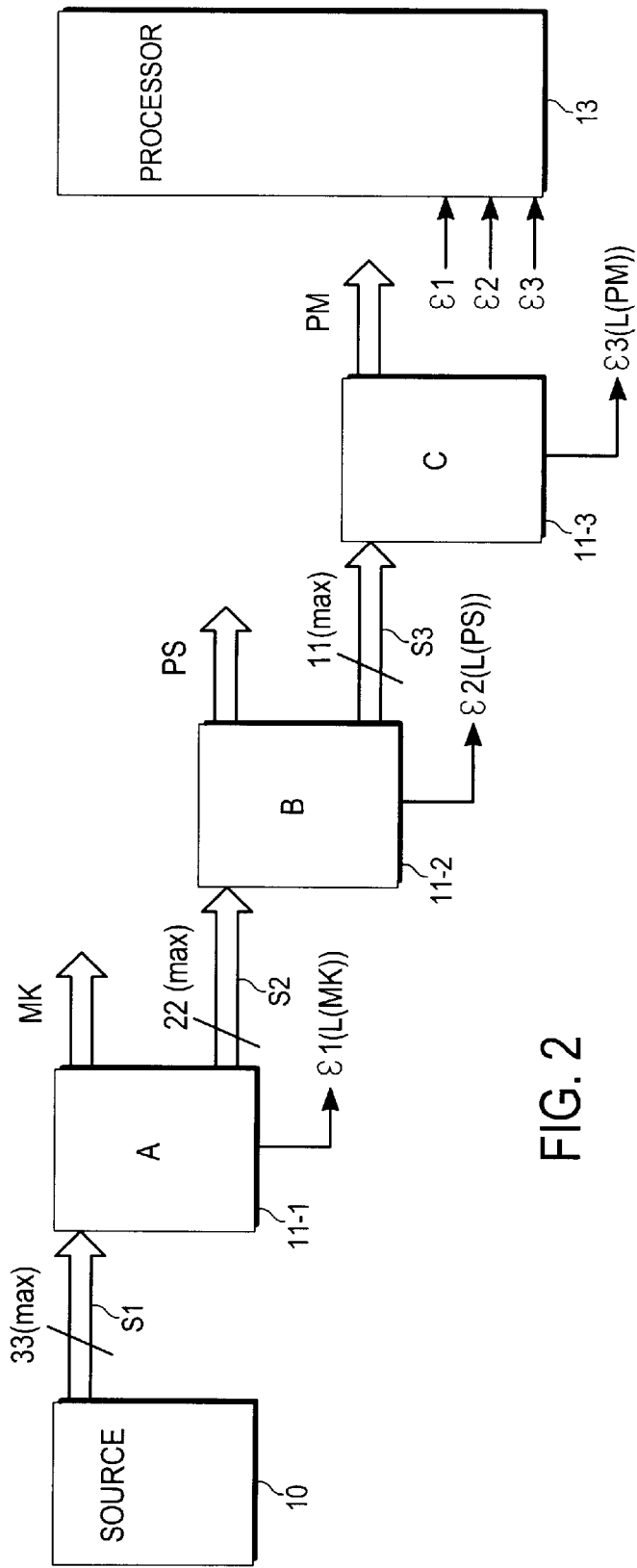
FIG. 2 schematically illustrates practice of the invention.

In FIG. 2, three consecutive segments, PM, PS and MK, in a stream S1 of maximum (acceptable) length 33T, are received at a first stream pre-processor 11-1, and the length L(MK) of the segment MK is determined and issued as an output signal. The present mark MK and its length L(MK) are received at a segment processor 13. If the length L(MK) of the segment MK is less than 3T or greater than 11T, the first stream pre-processor 11-1 optionally issues a first error signal $\epsilon1(L(MK))$ that is also received at the segment processor 13. If the segment length L(MK) lies in the range 3T–11T, no compensation or correction is required here.

The two remaining consecutive segments, PS and PM, in a stream S2 of maximum (acceptable) length 22T, are received at a second stream pre-processor 11-2, and the length L(PS) of the segment PS is determined. The preceding space PS and its length L(PS) are received at the segment processor 13. If the length L(PS) of the segment PS is less than 3T or greater than 11T, the second stream pre-processor 11-2 optionally issues a second error signal $\epsilon2(L(PS))$ that is also received at the ssegment processor 13. If the segment length L(PS) lies in the range 3T–11T, no compensation or correction is required here.

The remaining segment PM, in a stream S3 of maximum (acceptable) length 11T, is received at a third stream pre-processor 11-3, and the length L(PM) of the segment PM is determined. The preceding mark PM and its length L(PM) are received at the segment processor 13. If the length L(PM) of the segment PM is less than 3T or greater than 11T, the third stream pre-processor 11-3 optionally issues a third error signal $\epsilon3(L(PM))$ that is also received at the segment processor 13. If the segment length L(PM) lies in the range 3T–11T, no compensation or correction is required here.

At this point, the segment processor 13 has already received the lengths, L(MK), L(PS) and L(PM), and 0, 1, 2 or 3 error signals, indicating non-complying segment lengths, for the three consecutively arriving segments, MK, PS and PM, and has determined how to process each of the three consecutive segments before each of these segments is received at the processor.

Figure 3A:
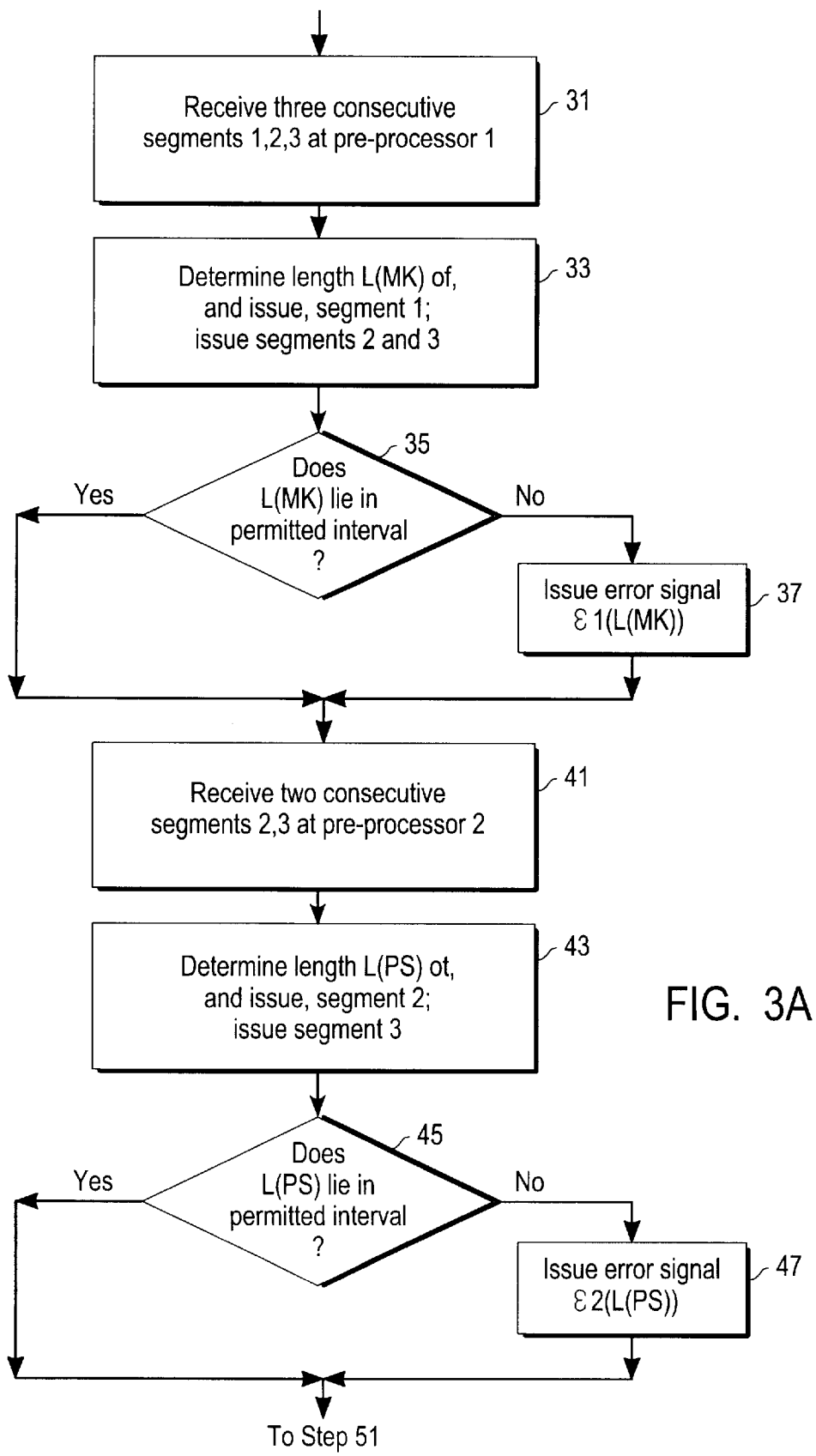
FIGS. 3A and 3B are a flow chart illustrating practice of one embodiment of the invention.
Figure 3B:
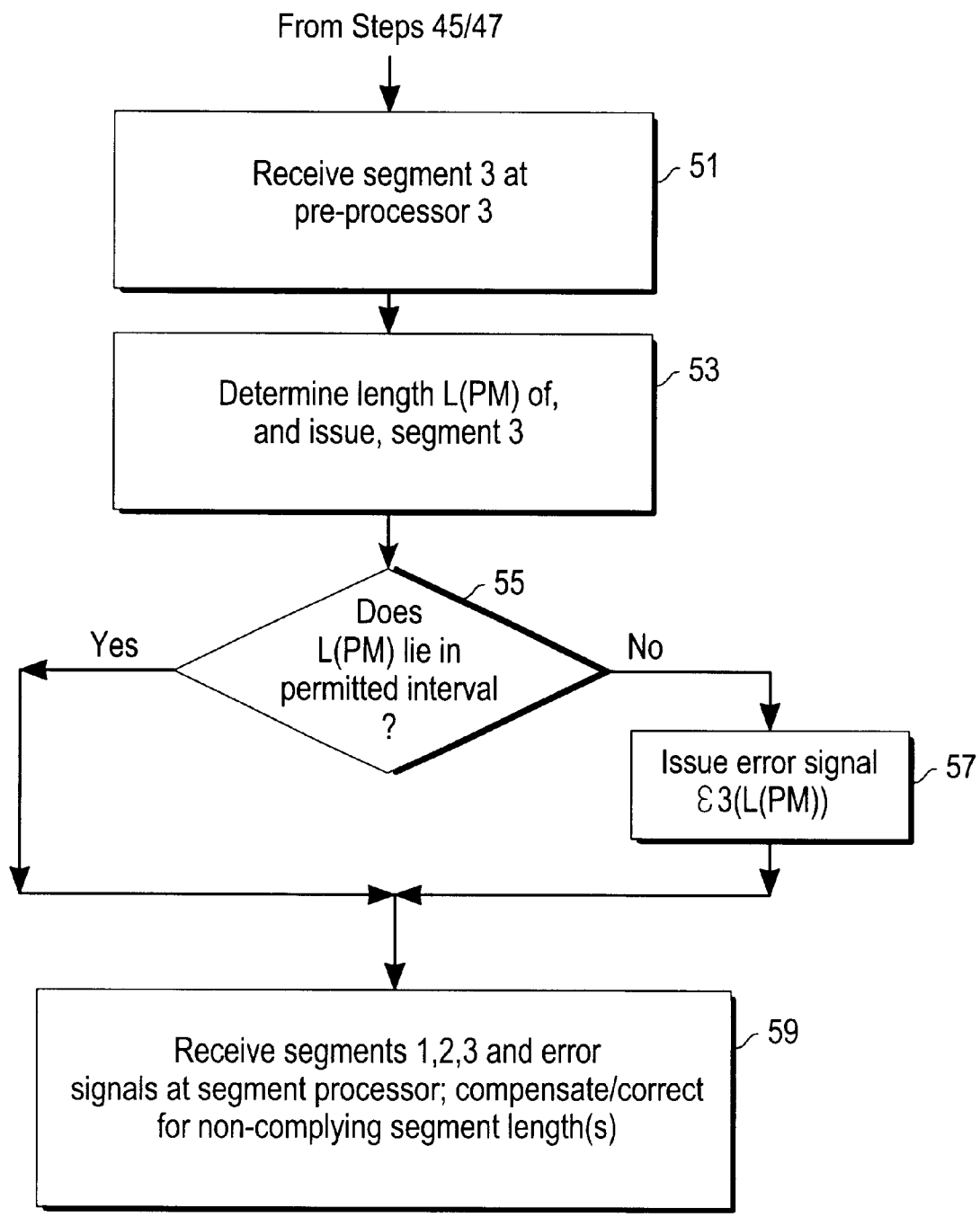

FIGS. 3A and 3B are a flow chart of a procedure for practicing an embodiment of the invention. In a first step 31, three consecutive segments, MK, PS and PM, having as-yet-unknown individual lengths, are received at a first pre-processor. The length L(MK) of the first segment MK is determined, in step 33, by determining where a sequence of one or more consecutive 1's first changes to a "0," and the first segment and combined second and third segments are issued separately. In step 35, the system determines if L(MK) lies in a permitted interval (e.g., 3T–11T). If the answer to the query in step 35 is "yes," the system moves to step 41. If the answer to the query in step 35 is "no," the system optionally issues an error signal $\epsilon1(L(MK))$, which preferably indicates the non-complying length L(MK), at step 37 and moves to step 41. One method of evaluating the length L(MK) is to determine if the inequality $$|L(MK)-(L_1+L_2)/2| \leq |L_2-L_1|/2 \tag{1}$$

is satisfied or is not satisfied, where $L_1=3T$ and $L_2=11T$ in this example. More general non-negative numbers $L_1$ and $L_2$ ($\geq L_1$) can be used here.

In step 41, the remaining two consecutive segments, PS and PM, are received at a second pre-processor. The length L(PS) of the second segment PS is determined, in step 43, by determining where a sequence of one or more consecutive 0's first changes to a "1," and the second segment and third segment are issued separately. In step 45, the system determines if L(PS) lies in a permitted interval (e.g., 3T–11T). If the answer to the query in step 45 is "yes," the system moves to step 51. If the answer to the query in step 45 is "no," the system optionally issues an error signal $\epsilon2(L(PS))$, which preferably indicates the non-complying length L(PS), at step 47 and moves to step 51. One method of evaluating the length L(PS) is to determine if the inequality $$|L(PS)-(L'_1+L'_2)/2| \leq |L'_2-L'_1|/2 \tag{2}$$

is satisfied or is not satisfied, where $L'_1=3T$ and $L'_2=11T$ in this example. More general non-negative numbers $L'_1$ and $L'_2$ ($\geq L'_1$) can be used here.

In step 51, the remaining segments PM is received at a third pre-processor. The length L(PM) of the third segment PM is determined, in step 53, by determining where a sequence of one or more consecutive 1's first changes to a "0," and the third segment is issued. In step 55, the system determines if L(PM) lies in a permitted interval (e.g., 3T–11T). If the answer to the query in step 55 is "yes," the system moves to step 59. If the answer to the query in step 55 is "no," the system optionally issues an error signal $\epsilon3(L(PM))$, which preferably indicates the non-complying length L(PM), at step 57 and moves to step 59. One method of evaluating the length L(PS) is to determine if the inequality $$|L(PM)-(L''_1+L''_2)/2| \leq |L''_2-L''_1|/2 \tag{3}$$

is satisfied or is not satisfied, where $L''_1=3T$ and $L''_2=11T$ in this example. More general non-negative numbers $L''_1$ and $L''_2$ ($\geq L''_1$) can be used here. At step 59, the system receives the segments MK, PS and PM, receives the error signals $\epsilon1$, $\epsilon2$ and/or $\epsilon3$ (if any has been issued), and compensates or corrects for one or more non-complying segment lengths, L(MK), L(PS) and L(PM). The approach shown in FIGS. 3A and 3B may be used for any three or more consecutive segments, such as FS, MK and PS, where mark and space positions are interchanged.

The numbers $L_1$, $L'_1$ and $L''_1$ may be the same or may be different; and the numbers $L_2$, $L'_2$ and $L''_2$ may be the same or may be different. The number N of consecutive mark and space segments in the initial stream S1 in FIG. 2 may be 3 or greater. At least two mark segments, or at least two space segments, should be included in the stream S1. The 0's and 1's defining the marks and spaces may be exchanged with each other.

What is claimed is:

1. A method for monitoring the length of consecutive mark and space segments processed by a computer, the method comprising:

receiving N consecutive mark and space segments, numbered 1, 2, 3, ..., N with $N\geq 3$, at a first segment monitor, and issuing segment number 1, a combination of at least segments number 2 and 3, and a length value for segment number 1;

receiving at least the two consecutive segments numbered 2, 3, ..., N at a second segment monitor, and issuing segment number 2, segment number 3, and a length value for segment number 2;

receiving at least the segments numbered 3, ..., N at a third segment monitor, and issuing segment number 3 and a length value for segment number 3;

receiving the segments numbered 1, 2, 3 at a selected segment processor; and when the length value for at least one of the segments number 1, 2 and 3 lies outside a permitted range, compensating for or correcting the length of the corresponding segment at the segment processor.

2. The method of claim 1, further comprising issuing an error signal $\epsilon n$ (n=1, 2, 3) when said length of said segment number n lies outside said permitted range.

3. The method of claim 1, wherein said process of determining when at said least one length L of said segments numbered 1, 2 and 3 lies outside said permitted range comprises determining if the length L satisfies $|L-(L1+L2)/2| \leq |L2-L1|/2$, where L1 and L2 are selected length values with $0 \leq L1 \leq L2$.

4. The method of claim 3, further comprising choosing said selected lengths to satisfy L1=3T and L2=11T, where T is a selected positive value.

5. The method of claim 1, further comprising choosing N=3.

6. A system for monitoring the length of consecutive mark and space segments processed by a computer, the system comprising:

a first segment length analyzer that receives N consecutive mark and space segments, numbered 1, 2, 3, ..., N with $N\geq 3$, and issues segment number 1, at least a combination of segments number 2 and 3, and a length value for segment number 1;

a second segment length analyzer that receives the segments numbered 2, 3, ..., N and issues segment number 2, segment number 3, and a length value for segment number 2;

a third segment length analyzer that receives the segments numbered 3, ..., N and issues segment number 3 and a length value for segment number 3; and a segment processor that receives at least the segments numbered 1, 2 and 3 and, when the length value for at least one of the segments number 1, 2 and 3 lies outside a permitted range, compensates for or corrects for the length of the corresponding segment.

7. The system of claim 6, wherein at least one of said first, second and third segment length analyzers provides an error signal $\epsilon n$ (n=1, 2, 3) when said length of said segment number n lies outside said permitted range.

8. The system of claim 6, wherein at least one of said first, second and third segment length analyzers and said segment processor determines when at said least one length L of said segments numbered 1, 2 and 3 lies outside a permitted range by determining if the length L satisfies $|L-(L1+L2)/2| \leq |L2-L1|/2$, where L1 and L2 are selected length values with $0 \leq L1 \leq L2$.

9. The system of claim 8, wherein said selected lengths satisfy L1=3T and L2=11T, where T is a selected positive value.

10. The system of claim 6, wherein said integer N=3.

* * * * *